(12) United States Patent
Lawrence, Jr. et al.

(10) Patent No.: US 12,726,592 B1
(45) Date of Patent: Sep. 1, 2026

(54) WEBCAM CAPTURE FOR COLLABORATION

(71) Applicant: Zoom Communications, Inc., San Jose, CA (US)

(72) Inventors: William Joseph Lawrence, Jr., Cincinnati, OH (US); Thomas William Noble, Murfreesboro, TN (US)

(73) Assignee: Zoom Communications, Inc., San Jose, CA (US)

( * ) Notice: Subject to any disclaimer, the term of this patent is extended or adjusted under 35 U.S.C. 154(b) by 263 days.

(21) Appl. No.: 18/139,129

(22) Filed: Apr. 25, 2023

(51) Int. Cl.

| | |
|---|---|
| ***H04N 7/15*** | (2006.01) |
| ***G06T 7/70*** | (2017.01) |
| ***G06V 10/25*** | (2022.01) |
| ***H04N 7/14*** | (2006.01) |

(52) U.S. Cl.
CPC ............... *H04N 7/157* (2013.01); *G06T 7/70* (2017.01); *G06V 10/25* (2022.01); *H04N 7/147* (2013.01); *H04N 7/152* (2013.01)

(58) Field of Classification Search
CPC ........ H04N 7/157; H04N 7/147; H04N 7/152; G06T 7/70; G06V 10/25
See application file for complete search history.

(56) References Cited

U.S. PATENT DOCUMENTS

| | | | | |
|---|---|---|---|---|
| 11,190,735 | B1 * | 11/2021 | Trim | G06V 20/52 |
| 11,601,613 | B1 * | 3/2023 | Clark | H04N 7/152 |
| 2008/0129844 | A1 * | 6/2008 | Cusack | H04N 23/80 348/241 |
| 2012/0092438 | A1 * | 4/2012 | Guzman Suarez | H04N 7/15 348/E7.083 |
| 2020/0186813 | A1 * | 6/2020 | Fishwick | H04N 19/12 |
| 2021/0019893 | A1 * | 1/2021 | Ananthanarayanan | G06N 3/08 |
| 2023/0109787 | A1 * | 4/2023 | O'Leary | G06V 40/28 348/14.09 |
| 2023/0145272 | A1 * | 5/2023 | Anderson | H04L 65/1069 379/202.01 |
| 2023/0353611 | A1 * | 11/2023 | Mayfield | H04L 65/403 |
| 2025/0004799 | A1 * | 1/2025 | Li | G06F 9/451 |

* cited by examiner

*Primary Examiner* — Phung-Hoang J Nguyen
(74) *Attorney, Agent, or Firm* — Kilpatrick Townsend & Stockton LLP

(57) ABSTRACT

In some implementations, techniques may include receiving, by a computing device that is participating in a virtual conference, a request to capture a virtual copy of a physical object. In addition, the techniques may include presenting, by the computing device and via a graphical user interface, a targeted area corresponding to a physical position in a field of view of an optical input component. The techniques may include capturing, by the computing device, the virtual copy of the physical object using the optical input component. Moreover, the techniques may include sharing, by the computing device, the virtual copy with one or more participants of the virtual conference. The techniques disclosed herein may include corresponding methods, systems, and computer readable non-transitory media.

20 Claims, 9 Drawing Sheets

WEBCAM CAPTURE FOR COLLABORATION

FIELD

This disclosure generally relates to video conferencing, and more specifically relates to techniques for capturing and sharing information by virtual conference participants.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
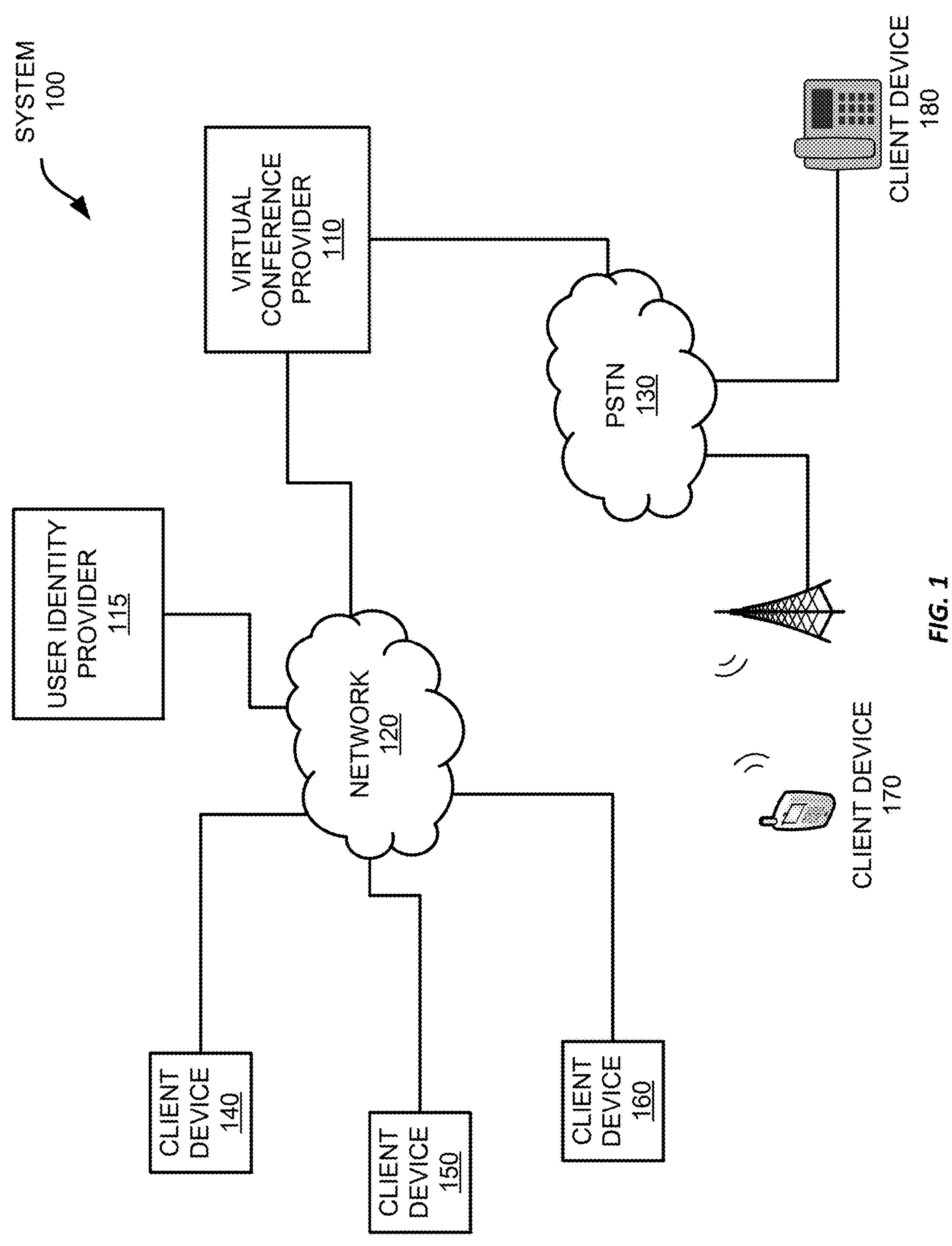
FIGS. 1-3 show example systems for implementing techniques for capturing and viewing virtual copies according to various embodiments.

Examples are described herein in the context of isolating videoconference streams. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference (or "videoconference"), participants may engage with each other to discuss any matters of interest. Typically, such participants will interact in a virtual conference using a camera and microphone, which provides video and audio streams (each a "media" stream) that can be delivered to the other participants by the virtual conference provider and be displayed via the various client devices' displays or speakers.

A conference participant may wish to share a virtual copy of a physical object with other meeting participants. For example, the physical object could be a two-dimensional object such as a drawing or a three-dimensional object such as a product sample. The object may be shared so that the conference participants can examine and discuss the representation.

Video conference software running on a client device can be used by a conference participant to exchange media streams, and interact, with other conference participants. This software can show a video feed, captured by an optical input component (e.g., a camera), as part of a graphical user interface that the participant uses to control the software. The video feed can show the virtual conference participant and the participant can use the feed to monitor and control how the participant appears to other conference participants.

The virtual conference participant can use a still image from the video feed to prepare a virtual copy of the physical object. Rather than capturing the still image using a second device, the client device's optical input component can directly capture the image, and, after processing, the image can be shared as a virtual copy of the physical object. The optical input component can be one or more cameras integrated into the client device or one or more cameras that are communicably connected to the client device (e.g., a USB web camera).

The image can be captured automatically or in response to a user input. For example, the graphical user interface can present a target area in the field of view of the optical input device (e.g., a bounded area superimposed on the video feed). The virtual conference participant can hold the physical object within this target area and the virtual conference software can detect the object and capture an image in response to the detected object. In addition, or alternatively, the image can be captured in response to a user input to the client device (e.g., clicking on a "capture" button).

The image can be edited and processed to prepare a virtual copy of the physical object. For example, various image filters, such as color balancing, contrast enhancement, or brightness filters, may be applied to the image by the virtual conference software to improve the image's quality. In addition, the image may be cropped, or the background changed, to focus the image on the object. This cropping can be performed manually, by asking the user to identify segments of the image that should be retained, or automatically by using an edge detection algorithm. The edge detection algorithm can identify the outer boundary of the physical object and remove or change the remainder of the still image (e.g., by resizing the image or adding a white background) to produce the virtual copy.

The virtual copy can be shared with the other meeting participants so that the physical object can be examined, annotated, and discussed in the virtual conference. It may be advantageous to share a three-dimensional virtual copy of an object in some circumstances. A machine learning model or algorithm can create a three-dimensional representation from one or more two-dimensional images. In some embodiments, a single image can be used as input to the machine learning model and a three-dimensional representation can be extrapolated from the single image. In some embodiments, multiple two-dimensional images, from diverse angles, can be used by a model to generate a three-dimensional representation.

The multiple two-dimensional images used to generate a three-dimensional virtual copy can be captured by the client device. A camera array, with cameras positioned at different angles around a target area, can be used to simultaneously capture different perspectives of the physical object. This camera array can be an optical input device that is integrated in, or communicably connected to, the client device. In addition, or alternatively, the physical object can be rotated so that an optical input device, with a single perspective, can capture images from different angles. For example, the graphical user interface can display a target area with instructions for the proper orientation of the physical object (e.g., front, back, top, and bottom). The conference participant can arrange the image according to the instructions and an image from each perspective can be captured. These images can be used to create a three-dimensional virtual copy of the physical object.

In some embodiments, the optical input device can be a three-dimensional camera (e.g., a range camera or a stereo camera) that can capture or generate a three-dimensional image. A range camera can be a camera that combines a two-dimensional image with an array of range readings that correspond to points in the image. A stereo camera can be an array of cameras that simulate binocular vision. The array comprises at least two cameras separated by a fixed distance. These cameras can capture two side by side images that can be combined to produce a three-dimensional image. The images captured by a three-dimensional camera can be used as input to a machine learning model that can produce a three-dimensional virtual copy of the physical object.

Advantages of the present disclosure include allowing virtual conference participants to generate and share two-dimensional and three-dimensional representations of physical objects within a virtual conference. These representations can allow for more intuitive and interactive conferences because the participants can examine and interact with an object without physically possessing a copy of the object. In addition, virtual copies are cheaper to prepare than physical copies and the virtual copies can be shared instantly with meeting participants without the need for advanced planning.

This illustrative example is given to introduce the reader to the general subject matter discussed herein and the disclosure is not limited to this example. The following sections describe various additional non-limiting examples and examples of controlling virtual conference settings.

Referring now to FIG. 1, FIG. 1 shows an example system 100 that provides virtual conferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide virtual conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity. In some instances, virtual conference provider 110 may provide a user profile language to virtual conference provider 210.

Figure 2:
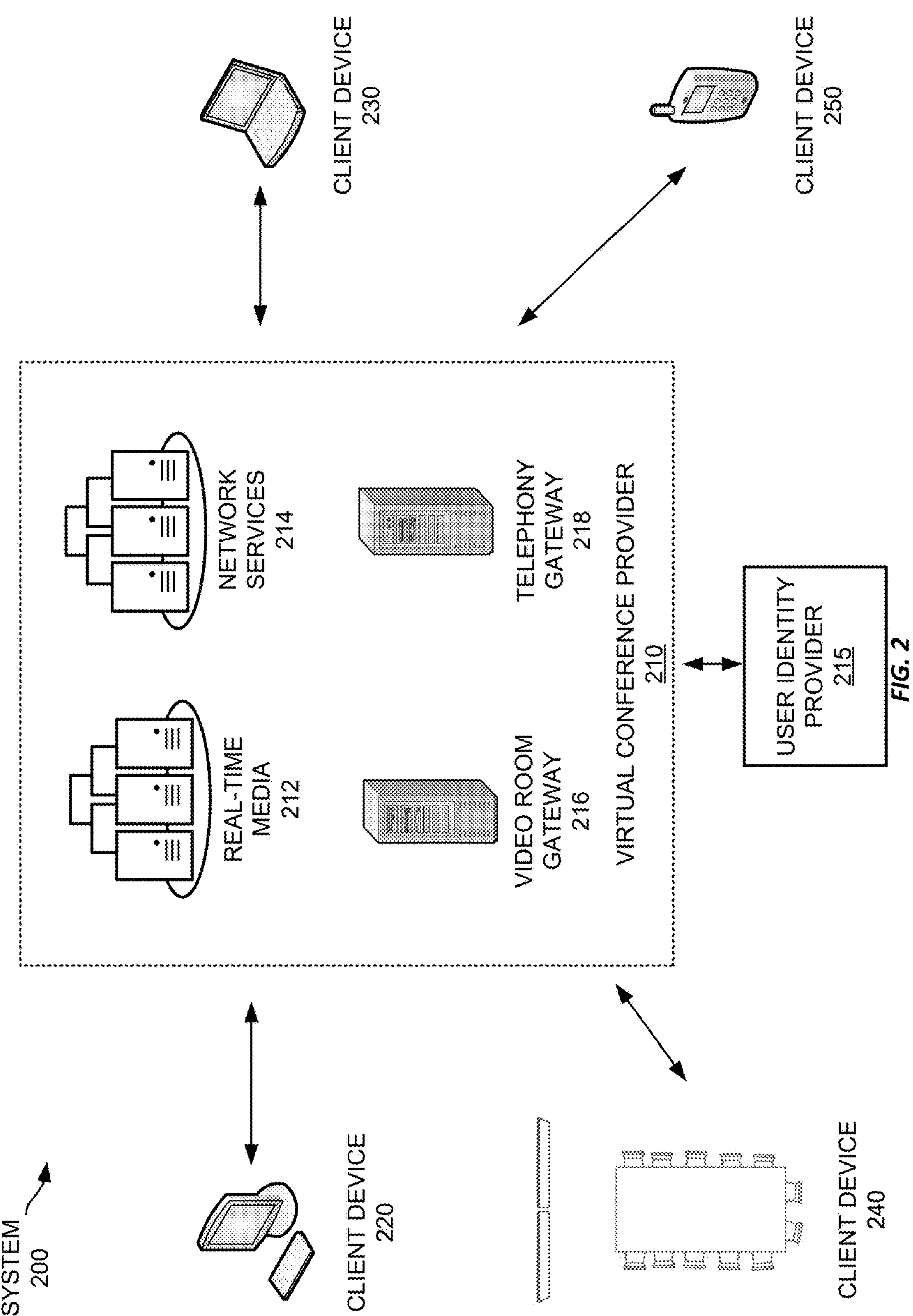

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application (or "client software") executed by a client device 140-160. Client software can include one or more host clients or participant clients. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, a meeting language, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the virtual conference provider 110. They also receive audio or video information from the virtual conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a virtual conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively. The user identify provider 115 may provide a user profile language to the virtual conference provider 110.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110.

Referring again to virtual conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where media streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted media streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt media content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt media streams. Thus, while encrypting the media streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides videoconferencing functionality to various client devices 220-250. The client devices 220-250 include two conventional computing devices 220-230, dedicated equipment for a virtual conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250.

The real-time media servers 212 provide multiplexed media streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing. In some instances, the media stream may contain metadata indicating a language for the media stream or the client devices 220-250. The language may be a device language provided by software on the client device or a language selected by a user of the client device via a graphical user interface (GUI).

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives media streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing media streams, the real-time media servers 212 may also decrypt incoming media stream in some examples. As discussed above, media streams may be encrypted between the client devices 220-250 and the virtual conference provider 210. In some such examples, the real-time media servers 212 may decrypt incoming media streams, multiplex the media streams appropriately for the various clients, and encrypt the multiplexed streams for transmission.

In some examples, to provide multiplexed streams, the virtual conference provider 210 may receive media streams from the various participants and publish those streams to the various participants to subscribe to and receive. Thus, the virtual conference provider 210 notifies a client device, e.g., client device 220, about various media streams available from the other client devices 230-250, and the client device 220 can select which media stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted media streams at a user's request. For example, the meeting host may be able to request that the meeting be recorded or that a transcript of the audio streams be prepared, which may then be performed by the real-time media servers 212 using the decrypted media streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted media streams at the virtual conference provider, such as monitoring video or audio quality, adjusting or changing media encoding mechanisms, etc.

It should be appreciated that multiple real-time media servers 212 may be involved in communicating data for a single meeting and media streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive media streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing media streams may be distributed throughout the virtual conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, a meeting language, a source language or a target language for translation, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving media streams. In some instances, the real-time media servers 212 may store a source language, target language, user profile language, meeting language, or identified language for the media streams sent and received by the server.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle media streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive media streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the virtual conference provider to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3:
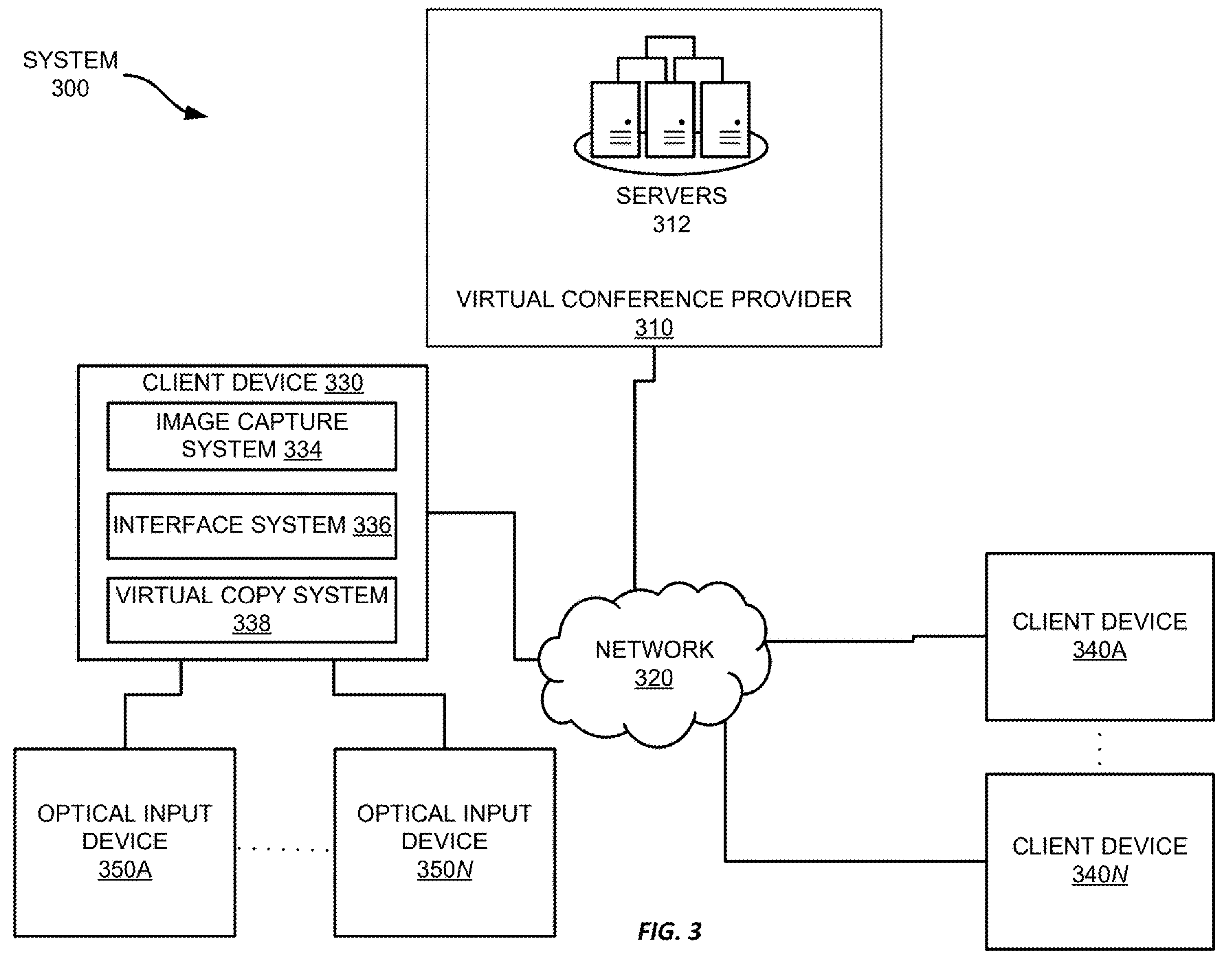

Referring now to FIG. 3, FIG. 3 shows an example system 300 for implementing techniques for capturing and viewing virtual copies according to various embodiments. The system 300 includes a virtual conference provider 310, which can be connected to multiple client devices 330, 340*a-n* via one or more intervening communication networks 320. In this example, the communications network 320 is the internet, however, any suitable communications network or combination of communications network may be employed, including LANs (e.g., within a corporate private LAN), WANs, etc.

Each client device 330, 340*a-n* executes virtual conference software, which connects to the virtual conference provider 310 and joins a meeting. During the meeting, the various participants (using virtual conference software, "client software," or "video conference software" at their respective client devices 330, 340*a-n*) are able to interact with each other to conduct the meeting, such as by viewing video feeds and hearing audio feeds from other participants, and by capturing and transmitting video and audio of themselves (e.g., media streams).

Client devices 330, 340*a-n* may join virtual conferences hosted by the virtual conference provider 310 by connecting to the virtual conferences provider and joining a desired virtual conference, generally as discussed above with respect to FIGS. 1-2. Once the participants have joined the conference, they may interact with each other in real time by exchanging audio and video feeds (e.g., media streams). However, participants may wish to share virtual copies of physical objects to collaborate more effectively in a virtual environment. For example, a medical device sales representative can share sample surgical implants (e.g., spinal implants) with potential clients without having to travel to individual practices. This virtual collaboration can save travel costs, reduce travel time, and improve efficiency by allowing for more sales meetings in a single day.

One or more of the client devices 330, 340*a-n* can provide image capture functionality and virtual copy generation functionality for video feeds generated by the client devices 330, 340*a-n* or received from the client devices 330, 340*a-n* via the virtual conference provider 310. Image capture functionality is provided by one or more image capture systems 334, which may involve a camera device and software running on a client device 330 that receives captured images from the camera device and may perform post-processing on the image. Similarly, virtual copy generation functionality is provided by one or more virtual capture systems 336 that can run on a client device 330. This image capture and virtual copy generation functionality can be facilitated by a graphical user interface provided by a graphical interface system 338. The image capture system 334 and the virtual copy system 336 can be executed by the client device 330 in response to a request received at the client device 330 or from any one of client devices 340*a-n*. This request can be received via a graphical user interface implemented by graphical interface system 338.

The image capture functionality can be used to capture a still image from a video feed generated by the client software. The video feed can be generated by an optical input device such as optical input devices 350*a*-350*n*. These optical input devices can be cameras that are integrated into client device 330 (e.g., a cell phone's camera) or devices that are communicably coupled with client device 330 (e.g., a camera connected to client device by a wired or wireless connection). In some embodiments, the video feed can be captured at variable resolutions specified by the client software (e.g., a high-quality video feed, a low-quality video feed etc.). The image capture system 334 can request that the video feed is captured at the highest available resolution to ensure that the still image is as clear as possible.

The image capture system 334 can capture a still image by selecting and storing one of the frames from the video feed. To capture the still image, the image capture system 334 can select a single frame at the point when an image capture command is received. The image capture command can be an input received at the client device 330 (e.g., a spacebar press; a click on an object in a user interface) or an automatic capture command triggered by the capture system 334. For instance, the capture command can be triggered by the capture model recognizing that an object is in the targeted area. In some embodiments, the capture command can be received at image capture system 334 from a different client device such as client devices 340*a*-340*n*.

In some embodiments, the still image can be selected from a range of frames corresponding to a time period that straddles an image capture command (e.g., 5 frames before and after the image capture command, frames from a 1-second time period centered on the image capture command). The image capture system can run the image through one or more models, filters, or algorithms to identify and select and store the highest quality image in the range. For instance, a blur detection model can be run and the frame with the lowest detected blur can be selected as the captured image. In addition, or alternatively, the one or more models, filters, or algorithms can include a peak signal to noise ratio (PSNR) model, a structural similarity index measure (SSIM) model, a feature similarity (FSIM) model, or a High Dynamic Range Visible Difference Predictor (HDR-VDP) model.

There can be a threshold score for each model and the image capture system 334 can reject images that fall below a threshold score. In some embodiments, the image capture system 334 can determine that none of the captured images are above a threshold score (e.g., a score generated by each model). In such circumstances, the image capture system 334 can inform the virtual conference participant, through the user interface of client device 330, that the image was not captured successfully and that an additional attempt to capture the image should be performed.

The still image may be captured from an optical input device 350*a*-350*n*. Each optical input device can be a camera, an array of cameras, a array comprising a camera and a range detector. Capturing the image can involve an instruction from the image capture system 334 to one or more of the optical input devices 350*a*-350*n*. For instance, the image capture system 334 may instruct the optical input device to turn on a light, trigger a flash, capture ranging information, or capture images from multiple cameras in an array. The image capture system 334 may instruct the client device 330 to increase the brightness of the device's display, change from a "dark mode" of the client software to a "light mode" of the client software, or the image capture system 334 can instruct the interface system 336 to change the background to a bright neutral color (e.g., white).

Video conference participants may use background filters to protect their privacy during a virtual conference. For instance, the filter may blur the background so that the other conference participants can see the virtual conference participant without being able to see the virtual conference participant's surroundings. This background functionality can be performed by an interface system 336 that implements the graphical user interface functionality for the client software running on client device 330.

The interface system 336 can implement the background functionality through an object recognition model that detects objects in the video feed. Upon detecting an object, an edge detection model of the interface system 336 can create a boundary around the detected object and blur the video feed outside of this boundary. This functionality can allow for image capture while protecting the virtual conference participant's privacy (e.g., by hiding the background). In addition, the interface system 336 can present a graphical indicator for the targeted area (e.g., a hollow shape superimposed on the video feed), and the image capture command can be a determination that a detected object is within the graphical indicator.

Upon capturing a still image, the image capture system 334 can provide the still image to a virtual copy system 338 that is configured to generate a virtual copy from the still image. This virtual copy functionality can include generating a two-dimensional or three-dimensional image from the still image provided by the image capture system 334 and, in some embodiments, more than one images can be provided to the virtual copy machine. The still image can be provided to the virtual copy system as a two-dimensional image, a two-dimensional image with ranging information, or a three-dimensional image.

In some embodiments, the virtual copy can be a two-dimensional image that has been processed by the virtual copy system 338. For example, the virtual copy system 338 can crop the still frame of a two-dimensional virtual copy to make the image of the physical copy more prominent in the virtual copy by increasing the percentage of the digital copy occupied by the virtual copy. For example, the virtual copy system 338 can use a machine learning model, that is trained to perform edge detection, to identify the boundaries of the depiction of the physical object and remove the background from the image.

The virtual copy system 338 may apply filters, models, or algorithms to the still image to improve the image's quality. For example, the virtual copy system 338 can apply one or more of a median filter, a Laplacian filter, a Gaussian filter, a neighborhood average filter, a spatial domain filter, a frequency domain filter, a linear filter, a nonlinear filter, or a spatial domain linear image filter to improve the image quality. The virtual copy system 338 may also use color correction filters, contrast correction filers, or any applicable image processing filters.

A three-dimensional image can be constructed from multiple still images captured by the image capture system 334. For instance, the virtual copy system 338 can use photogrammetry techniques to create a three-dimensional representation of the physical object by cross referencing points in two or more images with overlapping fields of view. These common points can be identified in different images, and, for each image, a ray can be traced from the camera through identified common points that the image shares with other images. Triangulation of these rays can be used to estimate a three-dimensional position for each common point, and a three-dimensional virtual copy can be created using these points. In addition, a machine learning model can be used by the virtual copy system 338 to prepare a three-dimensional model from two-dimensional images (e.g., Jun Gao and Tianchang Shen and Zian Wang and Wenzheng Chen and Kangxue Yin and Daiqing Li and Or Litany and Zan Gojcic and Sanja Fidler, GET3D: *A Generative Model of High Quality* 3*D Textured Shapes Learned from Images*, Advances In Neural Information Processing Systems, 2022).

Figure 4:
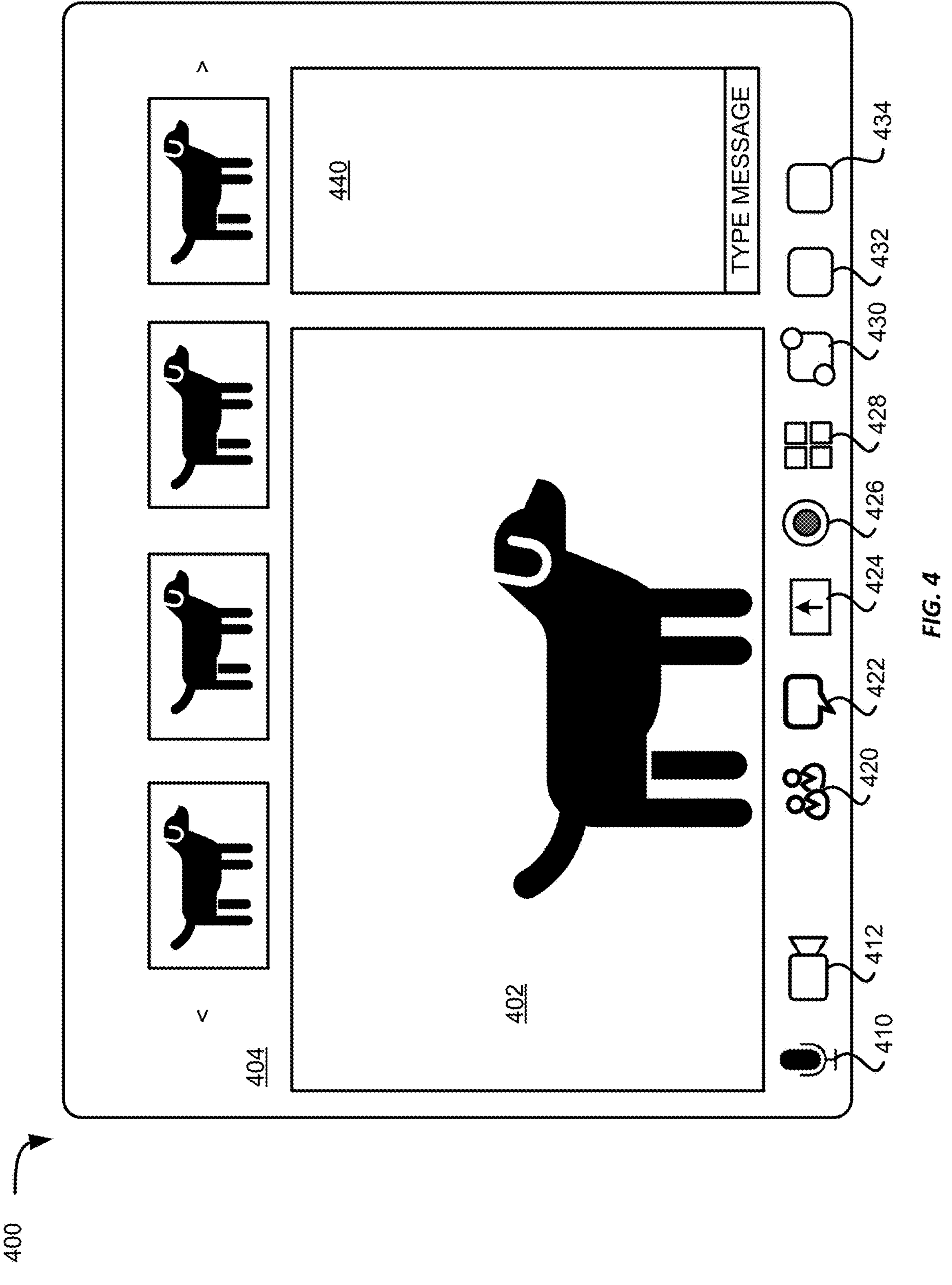
FIGS. 4-6 show example graphical user interfaces ("GUIs") for implementing techniques for capturing and viewing virtual copies by virtual conference participants according to various embodiments.

Referring now to FIG. 4, FIG. 4 illustrates an example graphical user interface ("GUI") 400 for capturing a virtual copy according to various embodiments. A client device, e.g., client device 330 or client devices 340*a-n*, executes a client software as discussed above, which in turn displays the GUI 400 on the client device's display. In this example, the GUI 400 includes a speaker view window 402 that presents the current speaker in the virtual conference. Above the speaker view window 402 are smaller participant windows 404, which allow the participant to view some of the other participants in the virtual conference, as well as controls ("<" and ">") to let the host scroll to view other participants in the virtual conference. On the right side of the GUI 400 is a chat window 440 within which the participants may exchange chat messages.

Beneath the speaker view window 402 are a number of interactive elements 410-530 to allow the participant to interact with the virtual conference software. Controls 410-512 may allow the participant to toggle on or off audio or video streams captured by a microphone or camera connected to the client device. Control 420 allows the participant to view any other participants in the virtual conference with the participant, while control 422 allows the participant to send text messages to other participants, whether to specific participants or to the entire meeting. Control 424 allows the participant to share content from their client device. Control 426 allows the participant to toggle recording of the meeting. Control 428 allows the user to select an option to join a breakout room. Control 430 allows a user to launch an app within the video conferencing software, such as to access content to share with other participants in the virtual conference. Control 432 can be selected to open a graphical user interface 500 that can be used to capture still images that can be used to create a virtual copy of a physical object. Control 436 can be selected to open a graphical user interface 600 that can be used to view virtual copies. While the graphical user interfaces 500-600 can be part of the virtual conference provider's software client 400, the configuration platform shown in graphical user interfaces 500-600 may be entirely separate from the software client 400.

Figure 5:
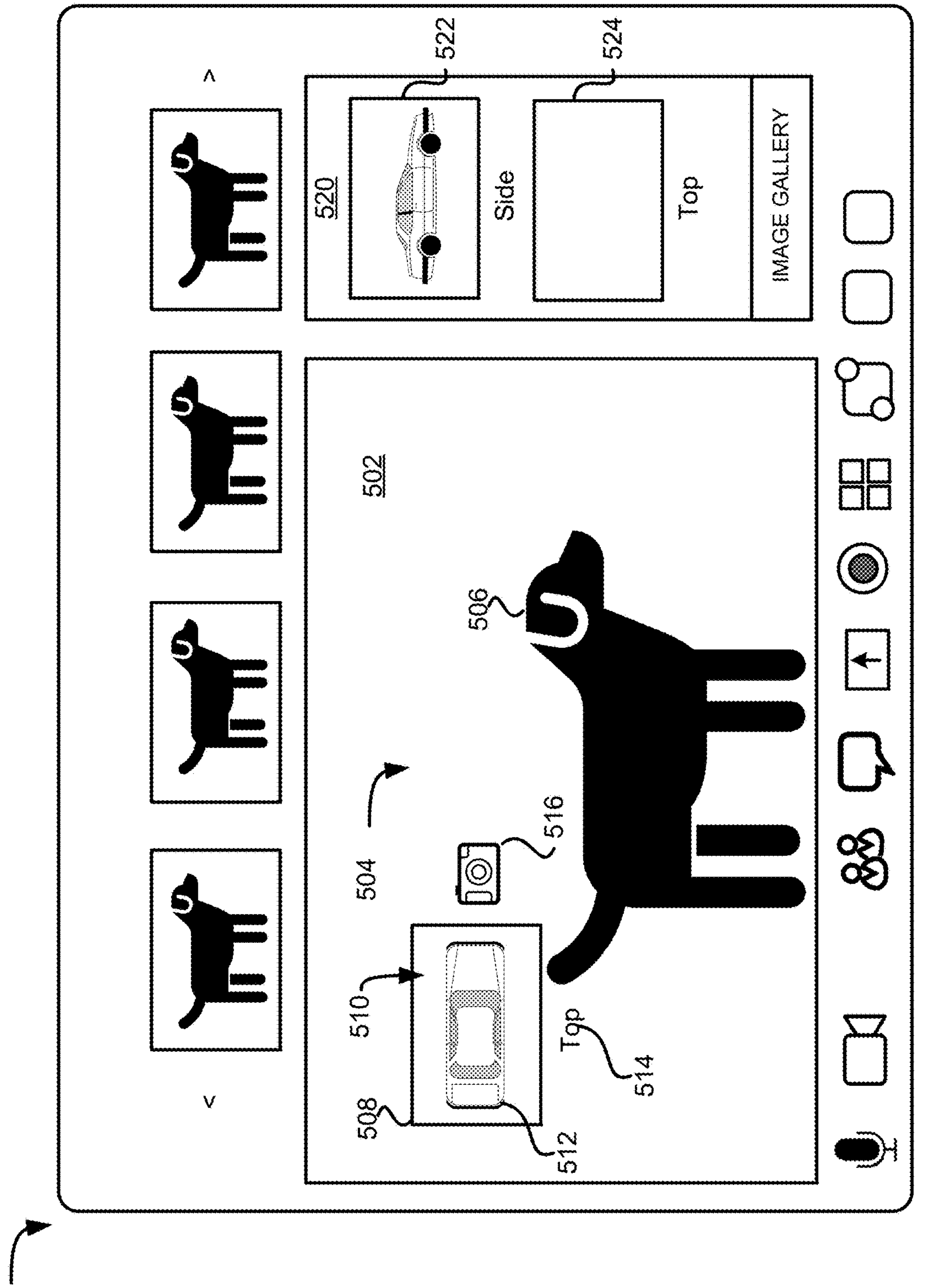

Referring now to FIG. 5, FIG. 5 illustrates an example graphical user interface ("GUI") 500 for capturing a virtual copy according to various embodiments. Speaker view window 502 can include a first background 504 that obscures the physical location where the speaker 506 is recording the video stream depicted in speaker view window 502 while allowing virtual conference participants to see the speaker 506. Targeted area 508 can be a graphic that is placed within the speaker view window 502 so that speaker 506 can determine where to hold the physical object so that a still image for a virtual copy can be captured. The targeted area 508 can include a second background 510 that may be a window (e.g., a gap or opening) in the first background 504 that allows a view of the physical location where the speaker 506 is recording the video stream. In some embodiments, the second background 510 can be a continuation of first background 504 or a background with a color or pattern that contrasts with the first background 504.

In some embodiments, different detection models or algorithms can be operable on each of the first background 504 and the second background 510. For example, a background algorithm can be used in the area corresponding to the first background 504 and an object detection algorithm can be used in the second background 510. The background algorithm can be used to create a background around any individuals, such as speaker 506, who are visible in the area corresponding to background 504. An area of the video feed corresponding to the detected individuals can be made visible while a background image can be superimposed on the remaining portion of the video feed corresponding to background 504. An object detection algorithm can detect objects within the targeted area 508. If objects were detected in the entire feed, it is probable that the first background 504 would not obscure the physical location where the speaker 506 is recording the video stream, because background objects (e.g., books on a shelf, phone, desk chair) would be allowed to pass through the first background 504. Limiting an object detection algorithm, or model, to the target area can allow for a still image to be captured while protecting the speaker's privacy. These features may require authorization of account administrator prior to use.

The speaker 506 can cause an object 512 to be in a physical location corresponding to the targeted area 508. There may be a procedure or ordered series of still images of the object 512 that are desired as input to the virtual copy system 338 and an instruction 514 can be displayed with the targeted area 508 so that the speaker 506 knows how to orient the object. As depicted, the instruction 514 is for a top perspective of the object and object 512 is correctly oriented according to the instruction 514. In some embodiments, the object 512 is not statically placed, but the still images are captured by rotating the object until a sufficient number of perspectives are captured as still images in the video feed.

Upon detecting the object using an object detection algorithm, the image capture system 334 can cause a still image to be captured. This capture can comprise flagging a frame from the video feed that corresponds to a time when the object is detected. In some embodiments, the image capture system 334 can cause a high-resolution image (e.g., higher than the resolution of the video stream) to be captured at the time when the image is detected. In addition, or alternatively, speaker 506 can trigger capturing of the image by pressing or otherwise interacting with capture button 516.

Image gallery 520 can display any captured still images of object 512. Gallery window 522 shows a still image of a side perspective of object 512, and gallery window 524 shows a location where the top perspective will be displayed after capture. The image gallery 520 can help speaker 506 to crop, edit, or revise the still images and determine if the captured images are acceptable. The image gallery 520 can help speaker 506 to understand which perspectives of object 512 have been captured and which perspectives are still pending. In some embodiments, image gallery 520 may be visible to the other participants in the virtual conference other than speaker 506.

Figure 6:
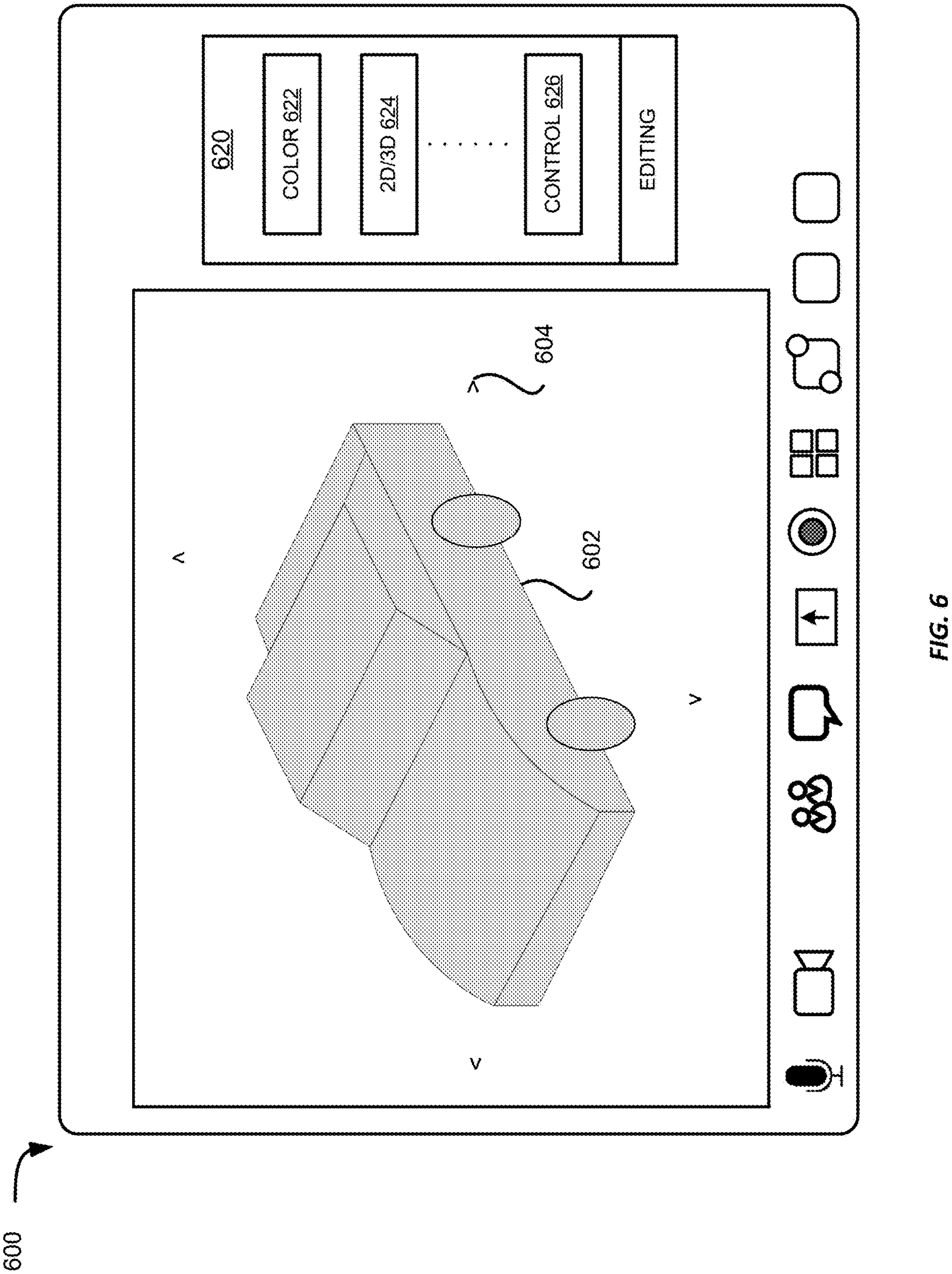

Referring now to FIG. 6, FIG. 6 illustrates an example graphical user interface ("GUI") 600 for viewing a virtual copy according to various embodiments. GUI 600 can be a part of a virtual conference or GUI 600 can form part of a persistent work environment that remains for longer than the duration of a single virtual conference and can be accessed before and after a virtual conference. Virtual copy 602 can be a two-dimensional or three-dimensional reconstruction of object 512. Orientation control 604 can be used to rotate or change the orientation of a three-dimensional copy, or to change the perspective shown for a two-dimensional copy. Editing controls 620 can be used to annotate, alter, or change the virtual copy. For instance, control 622 can be used to change the color of virtual copy 602, control 624 can be used to change the virtual copy 602 between two-dimensional and three-dimensional representations, and control 626 can represent any applicable editing technique that can be performed on virtual copy 602. For instance, control 626 can be used to enter an annotation mode where participants can add comments, highlight, draw, or otherwise annotate the virtual copy.

Any one of the functionalities described in relation to the image capture system 334, the interface system 336, or the virtual copy system 338 may be implemented with a machine learning model in some embodiments. Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 7:
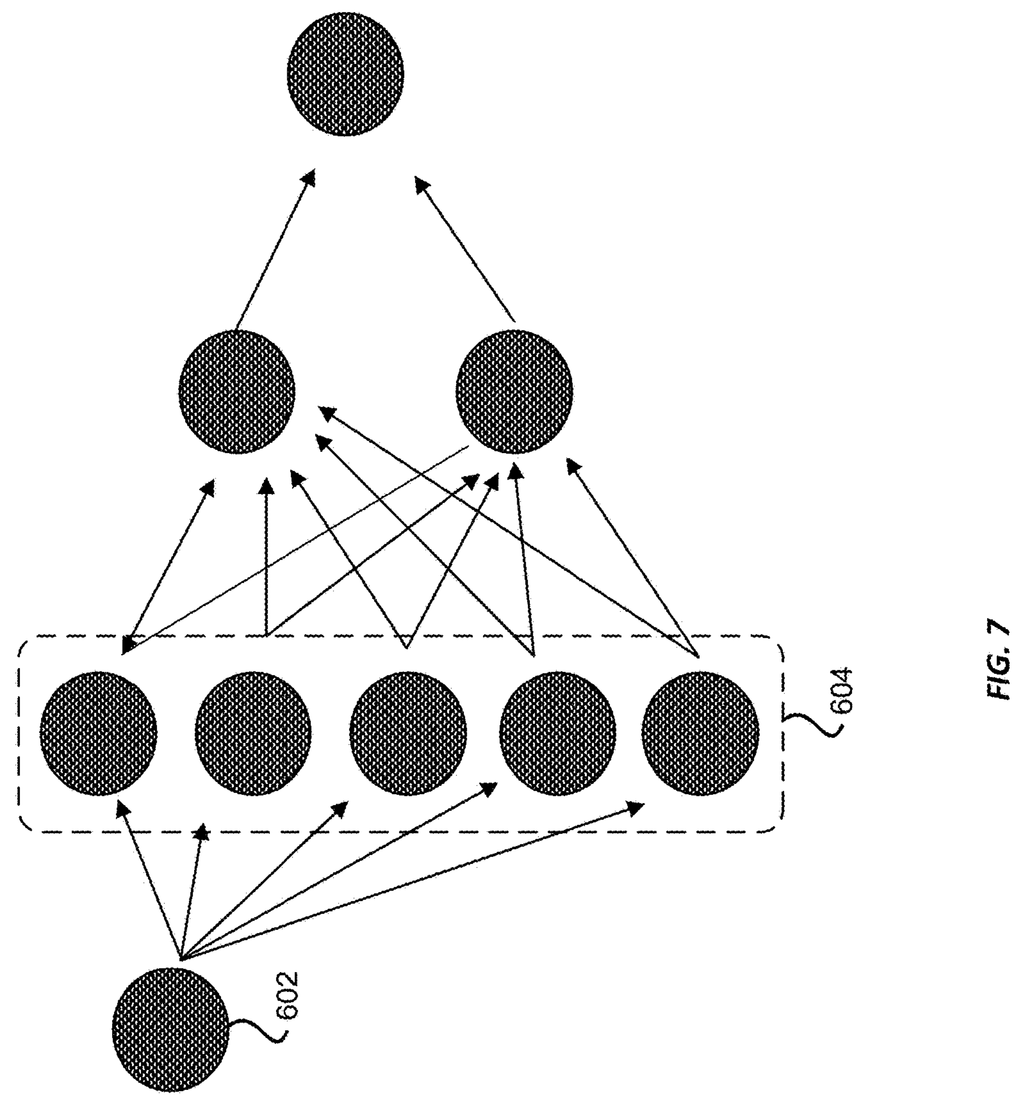
FIG. 7 shows an example machine learning model according to various embodiments.

FIG. 7 shows an example machine learning model of a neural network. As an example, the creation of a three-dimensional copy can be implemented with a neural network that comprises a number of neurons (e.g., neuron 702; Adaptive basis functions) organized in layers (e.g., layer 704). The training of the neural network can iteratively search for the best configuration of the parameters of the neural network for feature recognition and classification performance. Various numbers of layers and nodes may be used. A person with skills in the art can easily recognize variations in a neural network design and design of other machine learning models.

Figure 8:
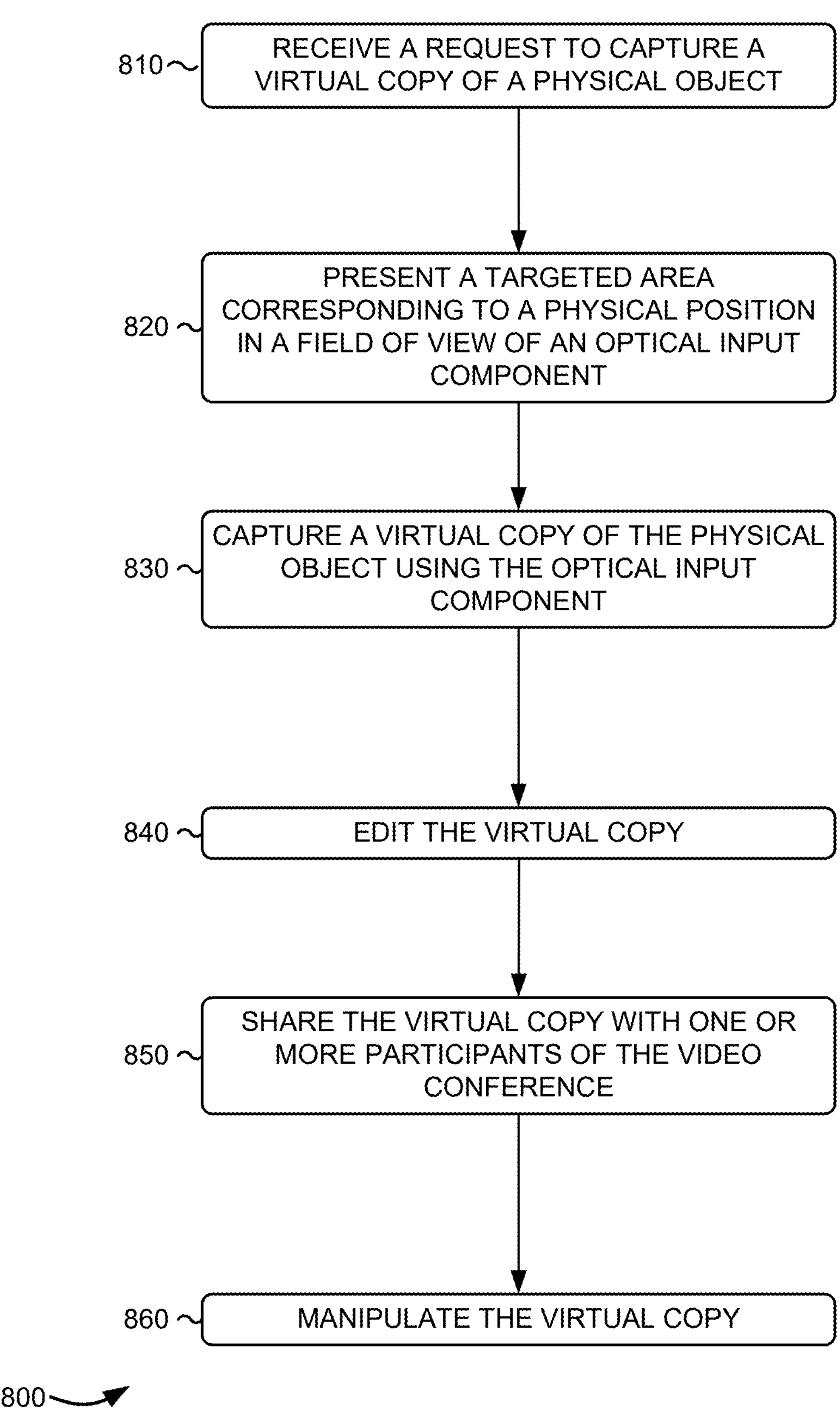
FIG. 8 shows an example method for implementing techniques for capturing and viewing virtual copies by virtual conference participants according to various embodiments.

Referring now to FIG. 8, FIG. 8 shows an example method 800 for implementing techniques for capturing virtual copies by virtual conference participants according to various embodiments. This example method 800 will be described with respect to the systems 100-300 shown in FIGS. 1-3, the example GUIs 400-600 shown in FIGS. 4-6; and the example computer device 900 shown in FIG. 9; however, any suitable systems or GUIs according to this disclosure may be employed.

At block 810, a request to capture a virtual copy of a physical object can be received by a computing device that is participating in a virtual conference. The request to capture the virtual copy can be a request to capture one or more still images that is received via the interface system 336. The one or more still images can be captured by an optical input device such as optical input devices 350*a*-350*n*. The computing device that is participating in the virtual conference is a device has been granted permission by the virtual conference provider to attend the conference.

At block 820, a targeted area can be presented by the computing device. The targeted area can be presented by a graphical user interface, and the targeted area can correspond to a physical position in a field of view of an optical input component. The targeted area can be designated by the virtual conference participant.

At block 830, the virtual copy of the physical object can be captured using the optical input component. The optical input component can be a camera, an array of cameras, a three-dimensional camera, or a camera with a range finder. The virtual copy can be captured by capturing one or more still images, by image capture system 334, in response to a trigger signal, and providing the one or more still images as input to virtual copy system 338. A virtual copy can be provided as output from the virtual copy system 338. The trigger signal can be a determination by the image capture system 224 that an object is present in the targeted area, or the trigger signal can be a user input provided via the interface system 336. In some embodiments, the virtual copy can be generated using a recording of a virtual conference. The virtual copy may be stored at the client device and distributed to the other client devices either directly or via the virtual conference provider. In some embodiments, the virtual copy can be sent to the virtual conference provider for storage in a provider storage device. This stored virtual copy can be associated with a recording of a particular meeting so that the virtual copy can be retrieved by any account with permission to access the meeting recording.

At block 840, the virtual copy can be edited. Editing the virtual copy can involve changing the color, patter, texture, or gloss of the virtual copy. The shape of the virtual copy can be changed including changing the relative size of different parts of the virtual copy. The virtual copy can be cropped, and the relative size of the virtual copy and background can be changed. In some embodiments, a preferred view can be set so that the virtual copy with multiple perspectives is shown from a chosen perspective when the copy is shared. The background surrounding the virtual copy can be changed to a specified color or image. In some embodiments, multiple virtual copies can be combined to create a new virtual copy, or a virtual copy can be split into two or more different virtual copies.

At block 850, the virtual copy can be shared with one or more participants of the virtual conference. A participant can be a client device that has permission to attend the virtual conference or a participant can be a client device that attended the virtual conference. Sharing the virtual copy can mean storing the virtual copy to a storage device of the virtual conference provider and providing an address identifying the virtual copy to a the conference participants or to a persistent virtual work environment (e.g., a work environment that can be accessed after the conference has concluded).

At block 860, the shared virtual copy can be manipulated. The virtual copy can be manipulated in response to commands, and these commands can be input at the client device that created the virtual copy. In some embodiments, the virtual copy can be created by a computer of the virtual conference provider (e.g., the image capture functionality and virtual copy functionality can be performed by servers 312) and the manipulation commands can be received from client devices. The commands include rotating the copy, cropping the copy, changing the size of the copy, changing the color of the copy, changing the size of the copy, changing the copy between a two-dimensional representation and a three-dimensional representation, and annotating the copy. The manipulated copy of the virtual copy can be saved as a new virtual copy.

Figure 9:
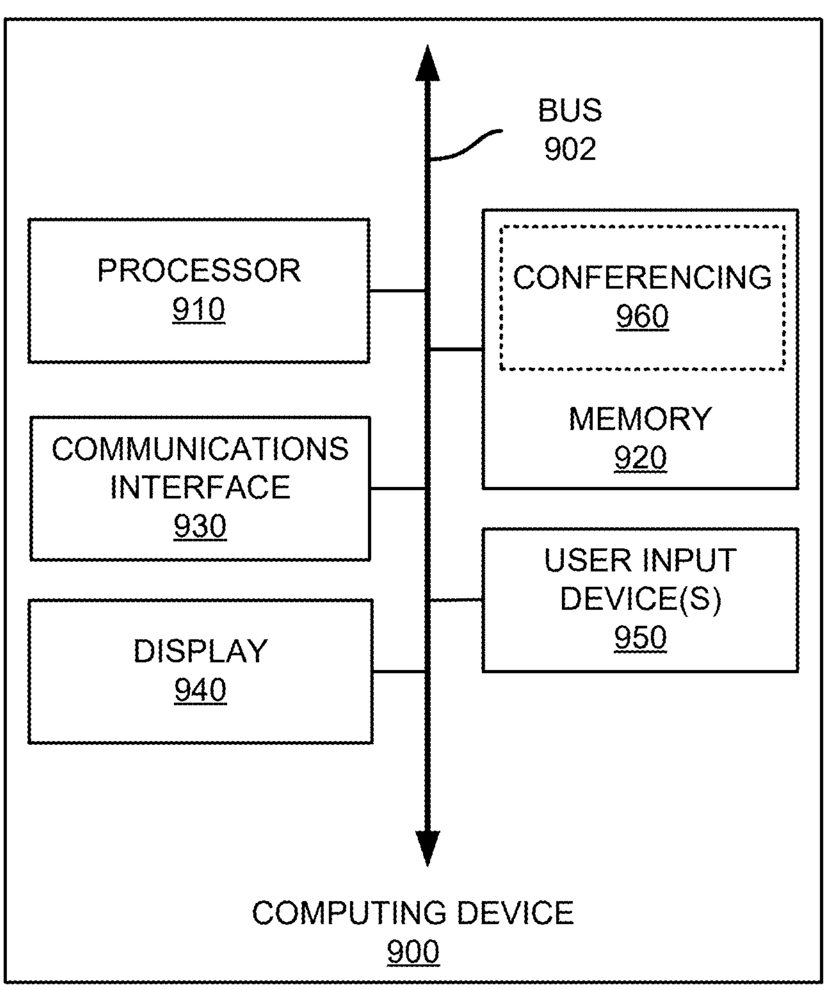
FIG. 9 shows an example computing device suitable for use with example techniques for capturing and viewing virtual copies according to various embodiments.

Referring now to FIG. 9, FIG. 9 shows an example computing device 900 suitable for use in example systems or methods for systems for implementing techniques for capturing and viewing virtual copies according to various embodiments. The example computing device 900 includes a processor 910 which is in communication with the memory 920 and other components of the computing device 900 using one or more communications buses 902. The processor 910 is configured to execute processor-executable instructions stored in the memory 920 to perform one or more methods for implementing a videoconference audio-visual controller according to different examples, such as part or all of the example method 800 described above with respect to FIG. 9. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a video conferencing application 960 to enable a user to join and participate in one or more virtual spaces or in one or more conferences, such as a conventional conference or webinar, by receiving media streams from a virtual conference provider, sending media streams to the virtual conference provider, joining and leaving breakout rooms, creating virtual conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method of comprising:

receiving, by a computing device that is participating in a virtual conference, a request to capture a virtual copy of a physical object from a video feed that is captured by an optical input component of the computing device;

presenting, by the computing device, a graphical user interface comprising a representation of the video feed, the video feed comprising a virtual conference participant against a first background, the first background configured to obscure a region surrounding the virtual conference participant and comprising a target area that is not obscured for capturing the physical object, the target area comprising a second background that is different from the first background;

capturing, by the computing device, the virtual copy of the physical object by capturing one or more images of the targeted area from the video feed; and sharing, by the computing device, the virtual copy with one or more participants of the virtual conference, comprising:

storing the virtual copy to a storage device of a virtual conference provider; and providing an address identifying the virtual copy to a persistent virtual work environment.

2. The method of claim 1, wherein the capturing further comprises:

detecting, by the computing device, the physical object in the target area of the video feed; and in response to the detecting, capturing, by the computing device, the virtual copy of the physical object using the optical input component.

3. The method of claim 1, wherein the capturing further comprises:

detecting, by the computing device, a trigger signal; and in response to the detecting, capturing, by the computing device, the virtual copy of the physical object using the optical input component.

4. The method of claim 1, wherein the virtual copy comprises at least one of:

a two-dimensional representation of the physical object; and a three-dimensional representation of the physical object.

5. The method of claim 1, wherein the optical input component is an array of cameras configured to capture a three-dimensional representation of the physical object.

6. The method of claim 1, wherein the computing device is participating in the virtual conference if the computing device has granted permission for the computing device to attend the virtual conference.

7. The method of claim 1, where in the shared virtual copy is configured to be manipulated in response to commands from client devices of the one or more participants of the virtual conference.

8. A system comprising:

one or more processors configured to:

receive, by a computing device that is participating in a virtual conference, a request to capture a virtual copy of a physical object from a video feed that is captured by an optical input component of the computing device;

present, by the computing device, a graphical user interface comprising a representation of the video feed, the video feed comprising a virtual conference participant against a first background, the first background configured to obscure a region surrounding the virtual conference participant and comprising a target area that is not obscured for capturing the physical object, the target area comprising a second background that is different from the first background;

capture, by the computing device, the virtual copy of the physical object by capturing one or more images of the targeted area from the video feed; and share, by the computing device, the virtual copy with one or more participants of the virtual conference, comprising:

storing the virtual copy to a storage device of a virtual conference provider; and providing an address identifying the virtual copy to a persistent virtual work environment.

9. The system of claim 8, wherein the capturing further comprises:

detecting, by the computing device, the physical object in the target area of the video feed; and in response to the detecting, capturing, by the computing device, the virtual copy of the physical object using the optical input component.

10. The system of claim 8, wherein the capturing further comprises:

detecting, by the computing device, a trigger signal; and in response to the detecting, capturing, by the computing device, the virtual copy of the physical object using the optical input component.

11. The system of claim 8, wherein the virtual copy comprises at least one of:

a two-dimensional representation of the physical object; and a three-dimensional representation of the physical object.

12. The system of claim 8, wherein the optical input component is an array of cameras configured to capture a three-dimensional representation of the physical object.

13. The system of claim 8, wherein the computing device is participating in the virtual conference if the computing device has granted permission for the computing device to attend the virtual conference.

14. The system of claim 8, where in the shared virtual copy is configured to be manipulated in response to commands from client devices of the one or more participants of the virtual conference.

15. A non-transitory computer-readable medium storing a set of instructions of, the set of instructions comprising:

one or more instructions that, when executed by one or more processors of a device, cause the device to:

receive, by a computing device that is participating in a virtual conference, a request to capture a virtual copy of a physical object from a video feed that is captured by an optical input component of the computing device;

present, by the computing device, a graphical user interface comprising a representation of the video feed, the video feed comprising a virtual conference participant against a first background, the first background configured to obscure a region surrounding the virtual conference participant and comprising a target area that is not obscured for capturing the physical object, the target area comprising a second background that is different from the first background;

capture, by the computing device, the virtual copy of the physical object by capturing one or more images of the targeted area from the video feed; and share, by the computing device, the virtual copy with one or more participants of the virtual conference, comprising:

storing the virtual copy to a storage device of a virtual conference provider; and providing an address identifying the virtual copy to a persistent virtual work environment.

16. The non-transitory computer-readable medium of claim 15, wherein the capturing further comprises:

detecting, by the computing device, the physical object in the target area of the video feed; and in response to the detecting, capturing, by the computing device, the virtual copy of the physical object using the optical input component.

17. The non-transitory computer-readable medium of claim 15, wherein the capturing further comprises:

detecting, by the computing device, a trigger signal; and in response to the detecting, capturing, by the computing device, the virtual copy of the physical object using the optical input component.

18. The non-transitory computer-readable medium of claim 15, wherein the virtual copy comprises at least one of:

a two-dimensional representation of the physical object; and a three-dimensional representation of the physical object.

19. The non-transitory computer-readable medium of claim 15, wherein the optical input component is an array of cameras configured to capture a three-dimensional representation of the physical object.

20. The non-transitory computer-readable medium of claim 15, where in the shared virtual copy is configured to be manipulated in response to commands from client devices of the one or more participants of the virtual conference.

* * * * *